United States Patent [19]
Larsen et al.

[11] Patent Number: 5,202,583
[45] Date of Patent: Apr. 13, 1993

[54] THYRISTOR CONTROLLED SERIES CAPACITOR VERNIER CONTROL SYSTEM

[75] Inventors: Einar V. Larsen, Charlton; Kara Clark, Schenectady, both of N.Y.

[73] Assignee: Electric Power Research Institute, Palo Alto, Calif.

[21] Appl. No.: 806,768

[22] Filed: Dec. 13, 1991

[51] Int. Cl.$^5$ ............................................. H02H 9/00
[52] U.S. Cl. .................................. 307/102; 323/211; 361/107
[58] Field of Search ................ 323/210, 211; 307/102, 307/105; 322/58; 361/58, 107

[56] References Cited

U.S. PATENT DOCUMENTS

| | | | |
|---|---|---|---|
| 4,188,573 | 2/1980 | Gyugyi et al. | 323/210 |
| 4,292,545 | 9/1981 | Hingorani | 323/210 |
| 4,302,715 | 11/1981 | Putman et al. | 323/210 |
| 4,311,253 | 1/1982 | Putman et al. | 322/25 |
| 4,355,241 | 10/1982 | Hingorani | 323/217 |
| 4,434,376 | 2/1984 | Hingorani | 323/210 |
| 4,724,333 | 2/1988 | Hedin | 322/58 |
| 4,808,843 | 2/1989 | Hedin | 323/58 |
| 4,811,236 | 3/1989 | Brenner et al. | 323/210 |
| 4,999,565 | 3/1991 | Nilsson | 323/210 |
| 5,032,738 | 7/1991 | Vithayathil | 323/211 |
| 5,121,048 | 6/1992 | Larson | 323/210 |

OTHER PUBLICATIONS

Christl, et al., "Advanced Series Compensation with Variable Impedance," presented at EPRI FACTS Workshop, Cincinnati, Ohio, Nov. 14, 1990.
Vithayathil, et al., "Case Studies of Conventional and Novel Methods of Reactive Power Control on an AC Transmission System," CIGRE paper for SC 38-02, Paris, Sep. 1988.

*Primary Examiner*—Steven L. Stephen
*Assistant Examiner*—Jeffrey Sterrett
*Attorney, Agent, or Firm*—Klarquist, Sparkman, Campbell, Leigh & Whinston

[57] ABSTRACT

A firing control scheme, including a method and apparatus, for secure vernier operation of a thyristor controlled series capacitor (TCSC) in series with a transmission line uses phase controlled firing based on monitored capacitor voltage and line current. The TCSC system has a thyristor switched inductive commutating circuit in parallel with the series capacitor. Vernier operation of the TCSC system is provided by predicting an upcoming firing angle for switching the commutating circuit to conduct a thyristor bypass current pulse therethrough. The current pulse causes an alternating offset component of voltage to appear across the series capacitor, in addition to the normal voltage component. Each current pulse changes the capacitor voltage proportionally to the integrated value of the current pulse. The TCSC system promptly responds to an offset command from a higher-level controller, precisely controls the duty on the bypass thyristors to minimize thyristor damage, and prevents drift of the capacitor voltage away from a desired setting during line current disturbances.

35 Claims, 9 Drawing Sheets

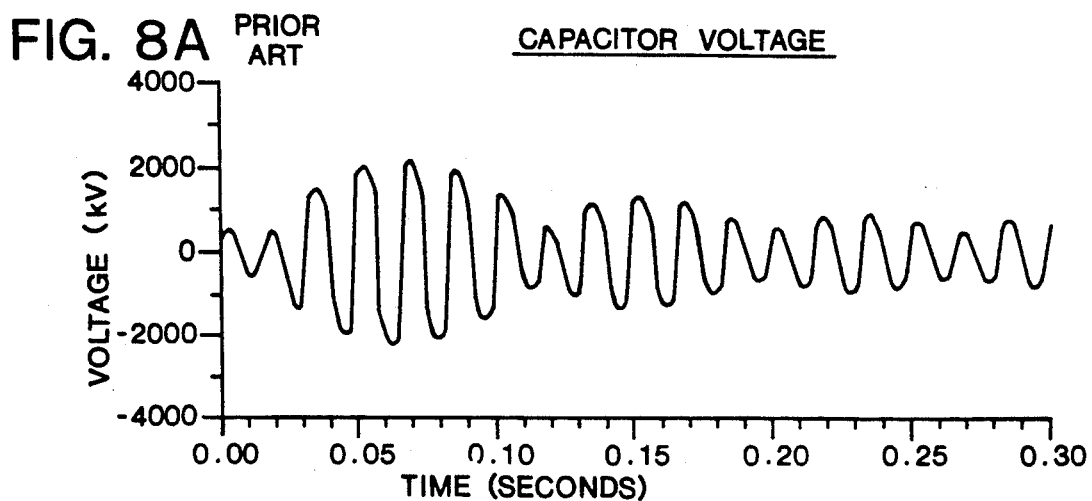
FIG. 8A PRIOR ART — CAPACITOR VOLTAGE
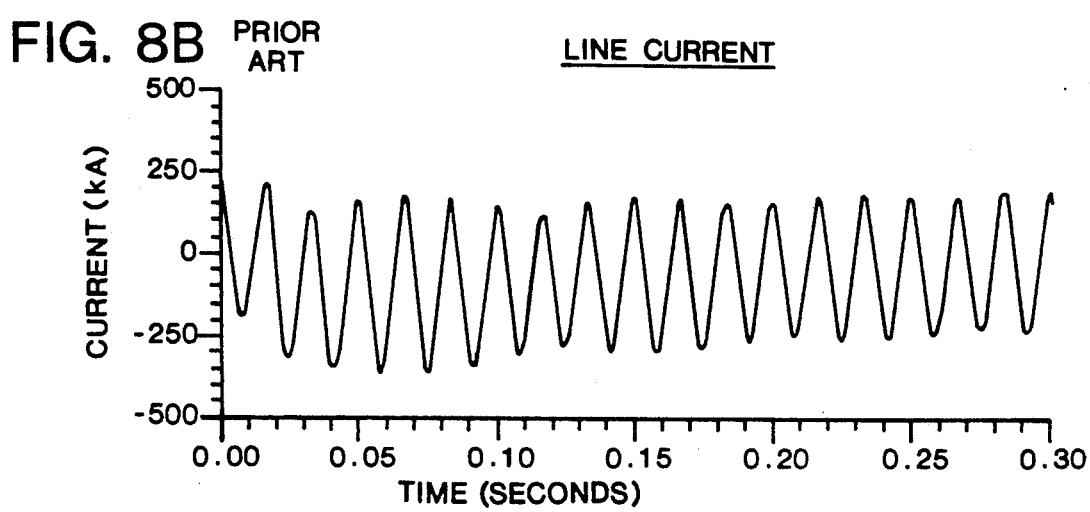
FIG. 8B PRIOR ART — LINE CURRENT
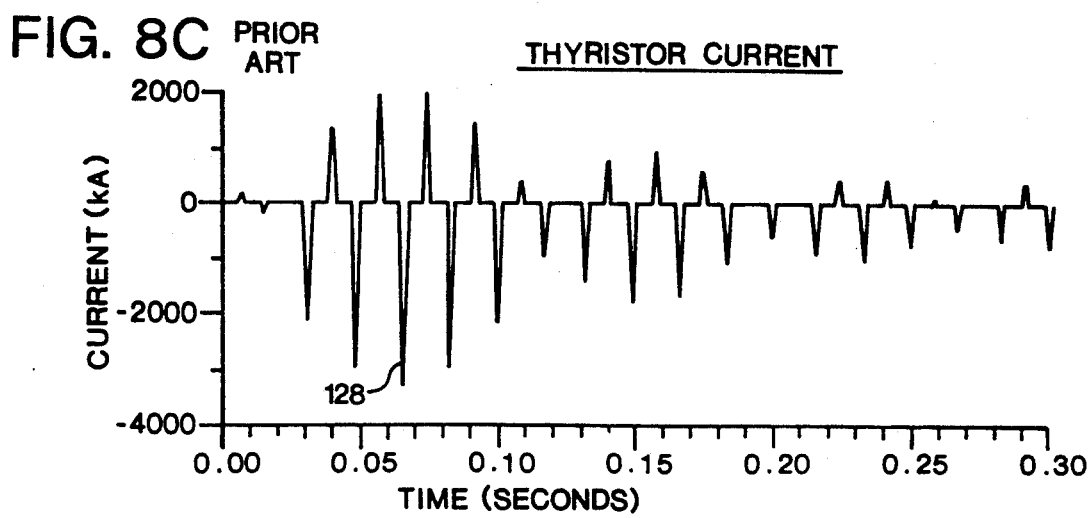
FIG. 8C PRIOR ART — THYRISTOR CURRENT

THYRISTOR CONTROLLED SERIES CAPACITOR VERNIER CONTROL SYSTEM

BACKGROUND OF THE INVENTION

The present invention relates generally to a thyristor controlled series capacitor in series with a substantially inductive transmission line, and more particularly to a firing control system, including a method and an apparatus, for secure vernier operation of a thyristor controlled series capacitor system, such as may be used in an alternating current (AC) power distribution system for damping subsynchronous oscillations and direct current (DC) offset.

Other systems have been proposed for damping subsynchronous oscillations and DC offset in power transmission systems. For example, U.S. Pat. No. 4,292,545 to Hingorani discloses a thyristor controlled capacitor in series with a transmission line. Hingorani's system uses a thyristor valve firing at a fixed time after a zero-crossing of the capacitor voltage. In U.S. Pat. No. 4,434,376 to Hingorani, which is a divisional of the Hingorani '545 patent, this concept is extended to have firing at a variable time after a capacitor voltage zero-crossing. In the Hingorani '376 patent, the firing time is adjusted relatively slowly, based upon a measurement of the frequency of the AC power system network voltage or current. In U.S. Pat. No. 4,355,241 also to Hingorani, overload protection is added by also triggering the thyristor valve in response to an over-voltage across a series reactance. This series reactance comprises a plurality of tuned circuits, each of which may be tuned to a separate undesirable subsynchronous frequency of the power system so the normal system frequency is unimpeded.

One serious drawback to the systems proposed by Hingorani in his '545, '376, and '241 patents (hereinafter and collectively referred to as "Hingorani") is that Hingorani requires several firings of the thyristor valves before the series capacitor voltage finally creeps-up to the desired level. Furthermore, after reaching the desired level, the Hingorani system typically overshoots the desired value. Other disadvantages of the Hingorani system are discussed further below.

In a 1988 paper by J.J. Vithayathil, et al. entitled, "Case Studies of Conventional and Novel Methods of Reactive Power Control on an AC Transmission System," it was suggested that by using partial conduction of an inductor across a series capacitor, the effective compensation level of the series capacitor could be varied substantially. Vithayathil also suggested that this system could be beneficial for stabilizing power systems. However, Vithayathil's inductor is controlled in the same way that a thyristor controlled reactor of a static VAR compensator is controlled, which is essentially the same as the Hingorani system. That is, both the Hingorani and Vithayathil systems are based on timing signals derived from the zero-crossing times of the capacitor voltage. The Vithayathil scheme also involves determining a firing time by assuming a purely sinusoidal voltage across the capacitor which, in actuality, is not a pure sinusoidal waveform.

In a 1990 paper by N. Christl, et al. entitled "Advanced Series Compensation With Variable Impedance," a "thyristor controller" mode is described which is similar to the "vernier" mode discussed further below. Christl shows several waveforms resulting from using the firing delay angle as the controlling variable.

Each of these earlier systems of Hingorani, Vithayathil, and Christl merely discloses a thyristor controlled, series capacitor system where the firing of the thyristor valves is based on a time determined from either the actual or the synthesized time of zero-crossings of the capacitor voltage. These systems are incapable of quickly and precisely damping subsynchronous oscillations and DC offsets in a power transmission system. Moreover, each of these firing systems is slow to respond.

None these earlier systems provides a secure means of controlling a thyristor controlled series capacitor where the actual capacitor voltage responds promptly to a command signal. Furthermore, these earlier systems are incapable of precisely controlling the duty on the thyristors. Additionally, these earlier systems are susceptible to drifting of the capacitor voltage away from a desired setting due to disturbances in the transmission line current.

Thus, a need exists for an improved firing control system for secure vernier operation of a thyristor controlled series capacitor used in power transmission systems to damp subsynchronous oscillations and DC offset, which is directed toward overcoming, and not susceptible to, the above limitations and disadvantages.

SUMMARY OF THE INVENTION

A firing control scheme, including a method and apparatus, for secure vernier operation of a thyristor controlled series capacitor (TCSC) in series with a transmission line uses phase control firing based on monitored capacitor voltage and line current. The TCSC system has a thyristor switched inductive commutating circuit in parallel with the series capacitor. Vernier operation of the TCSC system is provided by predicting an upcoming firing angle for switching the commutating circuit to conduct a thyristor bypass current pulse therethrough. The current pulse causes an alternating offset component of voltage to appear across the series capacitor, in addition to the normal voltage component. Each current pulse changes the capacitor voltage proportionally to the integrated value of the current pulse. The TCSC system promptly responds to an offset command from a higher-level controller, precisely controls the duty on the bypass thyristors to minimize thyristor damage, and prevents drift of the capacitor voltage away from a desired setting during line current disturbances.

An overall object of the present invention is to provide an improved method of controlling a thyristor controlled series capacitor system for use in an AC transmission line to damp subsynchronous oscillations and undesirable DC offset occurring therein.

A further object of the present invention is to provide an improved thyristor controlled series capacitor system, and an improved vernier controller for use with such a system.

Another object of the present invention is to provide a secure means of controlling a thyristor controlled series capacitor system which responds promptly to a firing command, minimizes damage to the thyristors, and maintains the capacitor voltage at a predetermined level despite power system disturbances.

The present invention relates the above features and objects individually as well as collectively. These and other objects, features and advantages of the present invention will become apparent to those skilled in the art from the following description and drawings.

BRIEF DESCRIPTION OF THE DRAWINGS

FIGS. 6A-9E show the responses of several systems and control variables when subjected to a small system disturbance;

FIGS. 6A, 6B and 6C are graphs for vernier operation of the TCSC system of FIG. 1, with FIGS. 6A-6C showing waveforms of the capacitor voltage, the line current, and the thyristor current, respectively;

FIGS. 8A, 8B and 8C are graphs for the Hingorani system, with FIGS. 8A-8C showing waveforms of the capacitor voltage, the line current, and the thyristor current, respectively; and FIGS. 9A, 9B, 9C, 9D and 9E are graphs for several of the internally controlled variables for the vernier controller of FIGS. 1 and 2, with FIGS. 9A-9D showing waveforms of the variables ALOP, ALMAG, ASPM, and VOIM, respectively, and FIG. 9E showing a waveform of BETAF, which corresponds to BETAP when BETAC is zero.

DETAILED DESCRIPTION OF A PREFERRED EMBODIMENT

Figure 1:
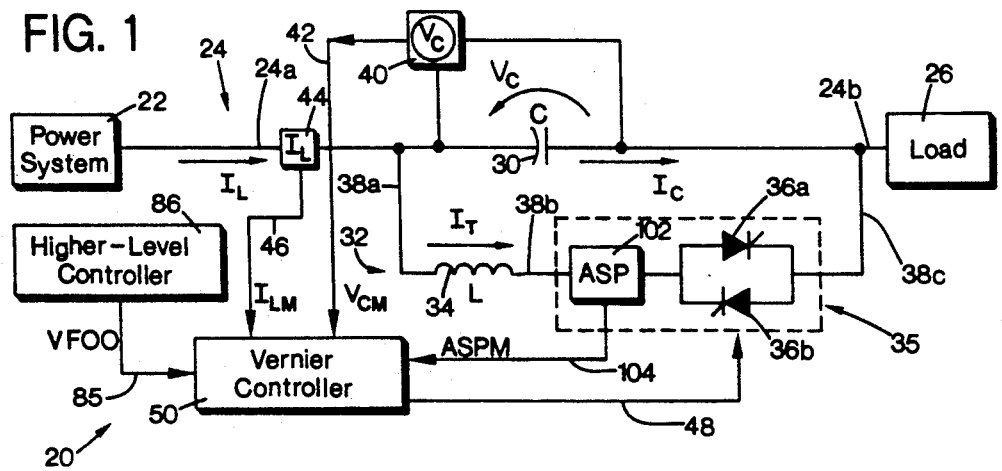
FIG. 1 is a single line schematic diagram of one form of a thyristor controlled series capacitor (TCSC) system of the present invention, shown in series with a transmission line.

FIG. 1 illustrates an embodiment of a thyristor controlled series capacitor (TCSC) system 20 constructed in accordance with the present invention for damping undesirable subsynchronous oscillations and undesirable DC offset occurring in a power system or grid 22. The power system 22 has a transmission line 24 with segments 24a and 24b coupling the TCSC system 20 in series with the power system 22 and with a load 26, respectively. A line current $I_L$ represents the direction of power flow from the power system 22 to the load 26.

The TCSC system 20 has a capacitor ("C") 30 in series with transmission line 24 and an inductive commutating circuit 32 in parallel with the capacitor 30. The capacitor 30 may be a plurality of discrete transistors joined as a capacitor bank having a known capacitive reactance $X_C$. The commutating circuit 32 includes an inductive component, such as an inductor ("L") 34, and a thyristor switch or valve 35 in series with the inductor 34. The thyristor valve 35 has two antiparallel diodes 36a and 36b, hereinafter referred to collectively as thyristors 36 unless otherwise noted. The commutating circuit 32 has conductor segments 38a, 38b and 38c coupling the inductor 34 and thyristor valve 35 with the capacitor 30 and transmission line 24 as shown. In FIG. 1 the following variables are shown: $I_L$ for the line current through transmission line 24, $V_C$ for the actual voltage across capacitor 30, $I_C$ for the current through capacitor 30, and $I_T$ for the bypass thyristor current pulse flowing through the inductor 34 and the thyristor valve 35.

The TCSC system 20 has a voltage monitor or sensor, such as a voltmeter 40, monitoring the voltage across the series capacitor 30. The voltage sensor 40 produces a measured capacitor voltage $V_{CM}$ signal 42 in response to the monitored actual capacitor voltage $V_C$. A line current monitor or sensor, such as an ammeter 44, monitors the line current $I_L$ flowing through the transmission line segment 24a. The line current sensor 44 produces a measured line current $I_{LM}$ signal 46 in response to the monitored line current $I_L$. The capacitor voltage $V_{CM}$ and line current $I_{LM}$ are preferably measured each half cycle.

Figure 2:
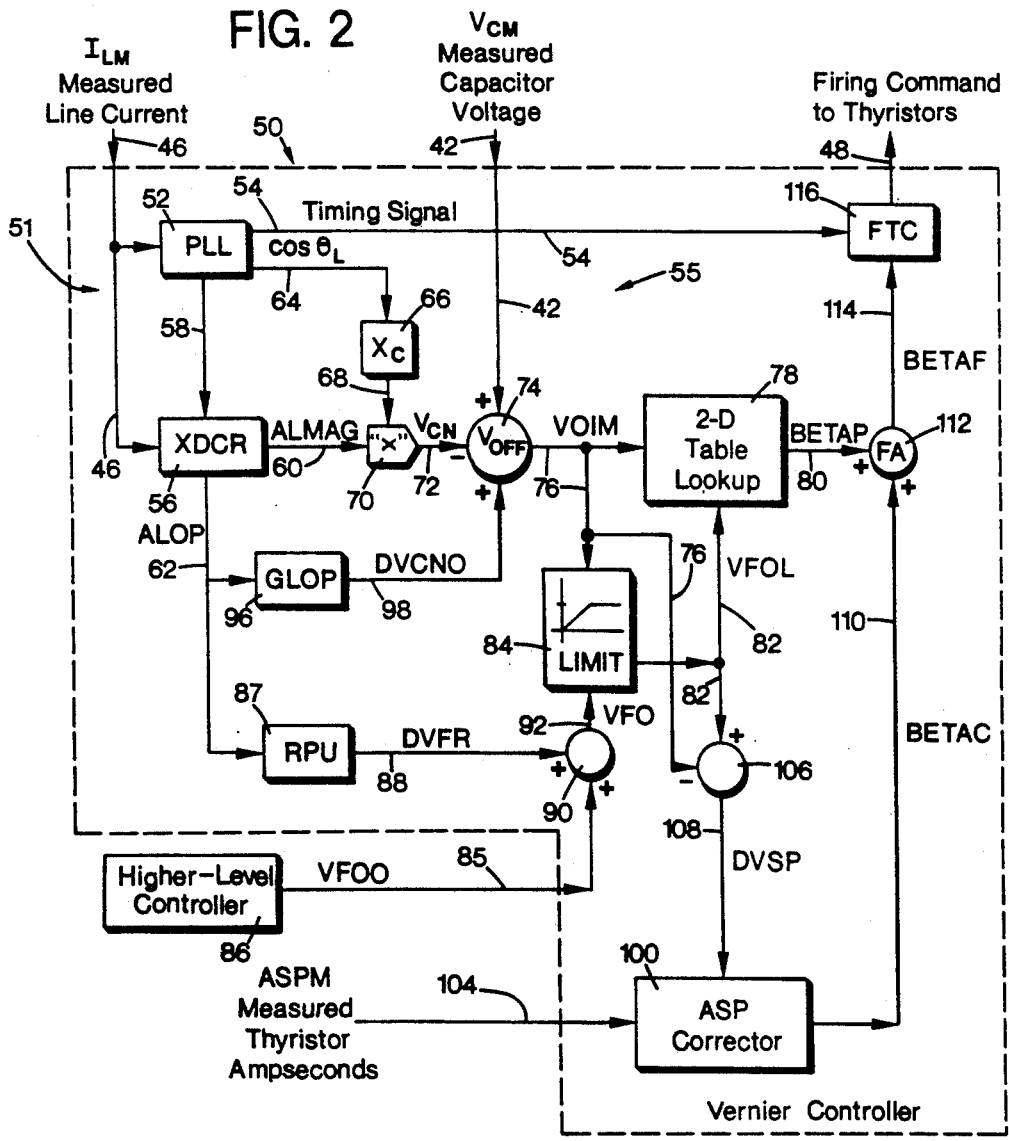
FIG. 2 is a block diagram of one form of a vernier controller of the present invention for controlling the TCSC system of FIG. 1.

The commutating circuit 32 conducts a thyristor current pulse therethrough when the bypass thyristor switch 35 fires to enter a conducting state in response to a firing command or firing pulse signal 48. This firing, preferably ahead of a capacitor voltage zero-crossing, produces an alternating offset voltage component across the series capacitor 30. As shown in FIG. 2, the TCSC system 20 includes control means, such as a vernier controller 50. The controller 50 has firing prediction means, such as a firing predictor 51, for receiving the measured line current $I_{LM}$ signal 46, the measured capacitor voltage $V_{CM}$ signal 42, and other signals as described further below, and for predicting therefrom an upcoming firing time at which the firing pulse signal 48 is provided by the controller 50 to the thyristor switch 35. From the description herein, it is apparent that the vernier controller 50 may be implemented primarily in hardware, primarily in software, or various equivalent combinations of hardware and software known by those skilled in the art.

Figure 3A:
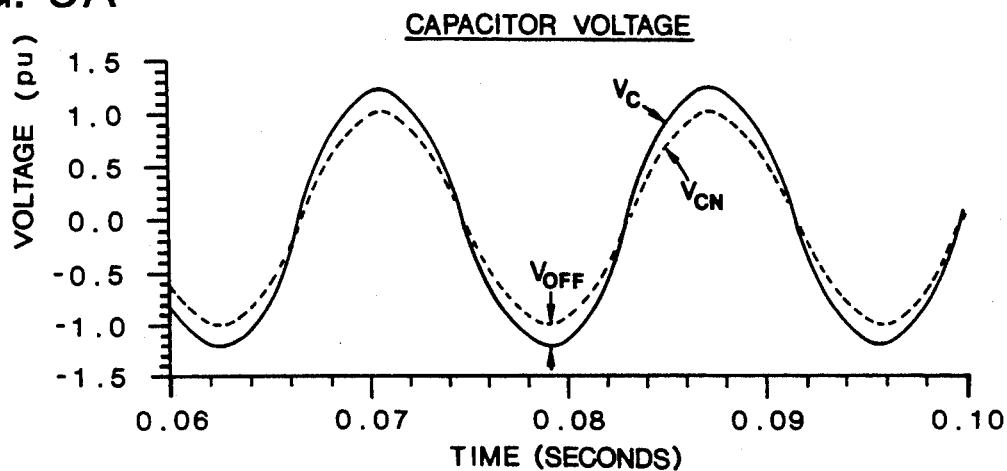
FIGS. 3A, 3B and 3C are graphs of vernier operation of the TCSC system of FIG. 1, with FIG. 3A illustrating the normal and actual capacitor voltages, FIG. 3B showing the line and thyristor currents, and FIG. 3C illustrating the alternating offset voltage component.
Figure 3B:
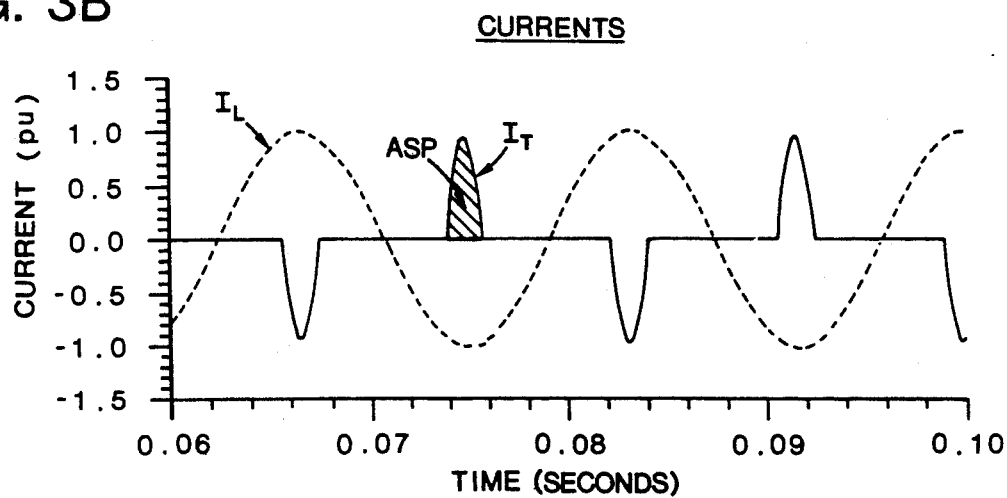
Figure 3C:
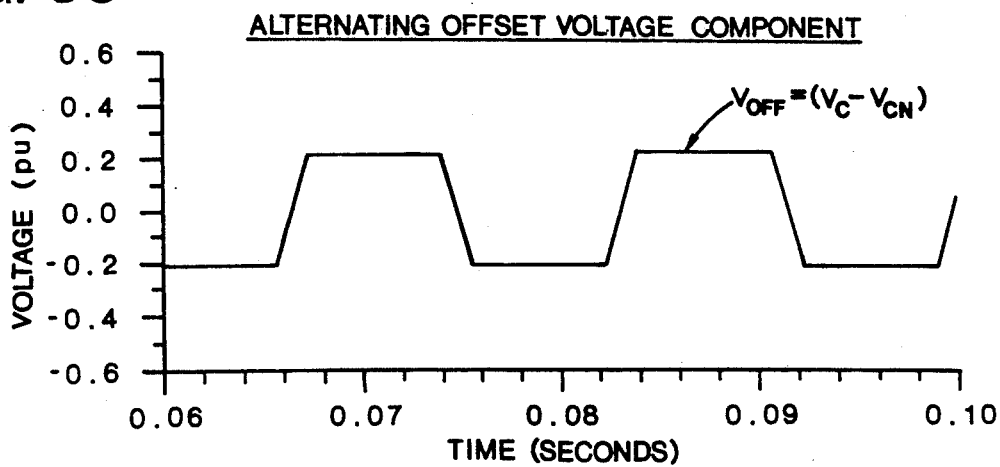

Before describing the operation of the vernier controller 50 in detail, a brief overview of the operation of the TCSC system 20 will be given with reference to the wave shapes of FIGS. 3A-3C. These graphs illustrate the per unit (pu) values of the variables for steady-state operation with 20% vernier control of the capacitor voltage, which is provided in a manner described further below. In FIG. 3A, the actual capacitor voltage $V_C$ includes a normal capacitor voltage component $V_{CN}$ which represents the capacitor voltage that would exist without thyristor firing and with a purely sinusoidal line current $I_L$. The difference between the capacitor voltage $V_C$ and the normal capacitor voltage component $V_{CN}$ is provided by an offset voltage component $V_{OFF}$ shown in FIG. 3C. Each pulse of thyristor current $I_T$ causes a change in the actual capacitor voltage $V_C$ that is proportional to an integrated value of the current $I_T$ in units of ampseconds (ASP), corresponding to the area labeled "ASP" under the $I_T$ current pulses, as shown in FIG. 3B. The following discussion of the operation of the vernier controller 50 also discloses a method controlling the TCSC system 20, and a method of inducing a predetermined voltage offset into the capacitor 30.

Referring again to FIG. 2, the controller 50 is illustrated as a primarily microprocessor based software implementation. The controller 50 has synchronizing means which may comprise a synchronizer or phase locked loop means, such as a phase-locked loop device (PLL) 52. The PLL 52 uses the monitored line current $I_{LM}$ signal 46 to create a first timing reference signal 54 which is in synchronism with the line current $I_L$. The PLL 52 may be implemented in a variety of structurally equivalent hardware and software forms known by those skilled in the art.

The firing predictor 51 includes TCSC parameter prediction means, such as a TCSC parameter predictor, for predicting the value of an upcoming variable or parameter of interest for the power flowing through the TCSC system 20. In the illustrated embodiment, the TCSC parameter prediction means comprises capacitor voltage predicting means, such as a capacitor voltage ($V_C$) predictor 55, for predicting the value of an upcoming initial capacitor offset voltage (VOIM) from the measured line current $I_{LM}$ and the measured capacitor voltage $V_{CM}$. The $V_C$ predictor 55 includes transduction means, such as a transduction device devised or programmed to perform a transduction method or routine (XDCR) 56. The XDCR 56 receives the $I_{LM}$ signal 46 and a second timing signal 58 generated by the PLL 52. In the illustrated embodiment, the second timing signal 58 is the same as signal 54, although in some applications it may be advantageous to have different values for timing signals 54 and 58. From the timing signal 58 and the $I_{LM}$ signal 46, the XDCR 56 determines the magnitude of the transduced line current (ALMAG) and provides a corresponding transduced line current magnitude signal 60. The XDCR 56 also determines an offset component of the line current (ALOP), and provides a corresponding measured line current offset component signal 62. The XDCR 56 may be implemented in a variety of structurally equivalent hardware and software forms known by those skilled in the art.

A further portion of the $V_C$ predictor 55 is provided by a portion of the PLL 52 which determines a sinusoidal cos $\phi_L$ function and provides a corresponding cos $\phi_L$ signal 64 in response thereto. The cos $\phi_L$ function represents an instantaneous point on the line current $I_L$ waveform corresponding to the timing signal 54. The angle $\phi_L$ represents the angle of the AC line current $I_L$ being predicted or estimated when the timing signal 54 is emitted from the PLL 52. The known value of the capacitive reactance $X_C$ of capacitor 30 is multiplied by the cos $\phi_L$ function signal 64 by factoring means, such as a capacitive reactance factoring routine or device, illustrated as an $X_C$ gain block 66, to provide a factored cos $\phi_L$ function ($X_C$ cos $\phi_L$) signal 68.

The $V_C$ predictor 55 also has multiplication means, such as a multiplication routine, shown as a multiplication function block 70. The multiplication function block 70 receives and multiplies together the ALMAG signal 60 and the ($X_C$ cos $\phi_L$) signal 68 to provide a predicted value of the normal capacitor voltage $V_{CN}$. The predicted normal capacitor voltage $V_{CN}$ is the capacitor voltage which is expected without any firing of the thyristor valve 35 (see FIG. 3A). For example, during steady state conditions, with the ALMAG signal 60 and the capacitive reactance $X_C$ each at a constant value, $V_{CN}$ is a sinusoidal waveform. The multiplier block 70 provides a $V_{CN}$ signal 72 corresponding to this predicted $V_{CN}$ value. The portion of the $V_C$ predictor 55 thus far described, may be referred to collectively as normal capacitor voltage determining device for determining $V_{CN}$ from the monitored line current $I_{LM}$.

The $V_C$ predictor 55 also has comparing means, such as a voltage offset $V_{OFF}$ comparator 74. The $V_{OFF}$ comparator 74 determines an offset voltage component $V_{OFF}$ of the capacitor voltage $V_C$ from the difference between the measured capacitor voltage $V_{CM}$ signal 42 and the predicted normal capacitor voltage $V_{CN}$ signal 72 (see FIGS. 3A and 3C). The comparator 74 expresses this difference by producing a measured initial offset (VOIM) signal 76, which is also the output of $V_C$ predictor 55.

Thus, the $V_C$ predictor 55 predicts the initial capacitor offset voltage VOIM from the monitored line current $I_{LM}$ received from the current sensor 44, and from the monitored capacitor voltage $V_{CM}$ received from the voltage sensor 40. The illustrated $V_C$ predictor 55 includes the portion of the PLL 52 which provides the cos $\phi_L$ signal 64 and the timing signal 58, the $X_C$ gain block 66, multiplier block 70, the XDCR 56, and the $V_{off}$ comparator 74.

By knowing this offset voltage component $V_{OFF}$ before firing the thyristor valve 35, the required firing angle may be directly determined so the desired capacitor voltage offset $V_{OFF}$ is obtained at the end of the resulting pulse of thyristor current $I_T$ flowing through the thyristor valve 35. The firing angle to provide the desired voltage offset is easily obtained knowing the physical parameters of the TCSC system circuit, which are primarily the capacitance of the capacitor 30, and the inductance L of inductor 34. To accomplish this, the firing predictor 51 has data storage or memory look-up means, such as a 2-D table look-up table circuit or a programmable data storage device 78. The relationship between these parameters may be precalculated and preprogrammed into look-up circuit or program 78. The look-up circuit or program 78 may be a programmed array, registers, latches or other structurally equivalent data storage and retrieval programs and devices known by those skilled in the art. The look-up circuit or program 78 determines a predicted firing angle and provides a predicted firing angle (BETAP) signal 80 from the VOIM signal 76 and a desired final offset (VFOL) signal 82 corresponding to a desired final capacitor voltage offset value VFOL.

This portion of the vernier controller 50 represents a predictive aspect of the controller which advantageously enhances the performance of this system over the earlier systems, including those of Hingorani. This phase controlled thyristor firing scheme, where the thyristor valve 35 is fired at a predicted upcoming time after a normal zero-crossing firing time, advantageously provides vernier control of the TCSC system 20. Vernier operation refers adjusting and controlling the capacitor voltage $V_C$ in a continuous manner over the entire voltage waveform.

The firing predictor 51 has limiting means, such as a limiter 84, for limiting VFOL signal 82 to limit the maximum duty of the thyristors 36. The limited VFOL signal 82 is based on the difference between the VOIM signal 76 and a final offset ordered (VFOO) or command signal 85. The VFOO command signal 85 corresponds to an ordered offset for the capacitor voltage $V_C$ which may be generated by a higher-level controller 86. The higher-level controller 86 may be provided, for example, by a system dispatcher of the power system 22 to obtain a desired voltage drop across the TCSC system 20. Another example of the higher-level controller 86 is a load control device (not shown) for industrial applications to control the manner in which load 26 appears to the power system 22.

Optionally, the VFOO command signal 85 may be modified to enhance the performance of the TCSC system 20 by providing a resistive component behavior for the TCSC system 20 as seen by the transmission line 24 and power system 22. To accomplish this enhancement, the illustrated controller 50 has resistive modeling modulator means, such as a resistive effect (RPU) modulator 87, for modulating the VFOO command signal 85 upon receipt from the higher-level controller 86. In essence, the resistive effect modulator 87 modulates the VFOO command signal 85 in a manner which causes the overall reaction of the TCSC system 20 to resemble a resistor in the transmission line 24.

The RPU modulator 87 receives the ALOP signal 62 and multiplies signal 62 by an RPU gain value which represents the magnitude of the desired resistive effect. In this manner, the resistive effect modulator 87 provides a modulating voltage (DVFR) signal 88. The VFOO command signal 85 and the DVFR signal 88 are added together by summing means, such as a summer circuit or routine 90, to produce a final offset voltage (VFO) signal 92. It is apparent that without the optional DVFR signal 88, the final offset voltage VFO signal 92 would correspond to the ordered final offset voltage VFOO signal 85.

The illustrated limiter 84 limits the VFOL signal 82 to a maximum limit based on the difference between the initial VOIM signal 76 and the final VFO signal 92. This limiting function advantageously provides a desired direct control of the duty imposed on the thyristors 36a and 36b. The thyristor duty is limited because the ampseconds ASP value of a pulse of the thyristor current $I_T$ is directly related to the change in the capacitor voltage $V_C$ over the duration of the pulse (see FIG. 3B). It is apparent that other types of limiting functions may be implemented in particular applications to limit the thyristor duty.

Optionally, the vernier controller 50 may have intra-cycle voltage prediction enhancing means, such as a voltage prediction enhancer (GLOP) 96, for enhancing the prediction of the initial capacitor offset voltage VOIM to predict the value of VOIM at a predetermined intra-cycle time during the thyristor current pulse. The GLOP 96 receives the ALOP signal 62 and multiplies it by a GLOP gain value. The GLOP 96 output is a desired or predicted capacitor voltage (DVCNO) signal 98 which predicts an inter-cycle value for $V_{OFF}$, such as when the thyristor current $I_T$ pulse is a certain way through a cycle, for instance, half way through the cycle. The DVCNO signal 98 is added to the $V_{CN}$ signal 72 and the $V_{CM}$ signal 42 by the $V_{OFF}$ comparator 74. This is possible since the offset component of the current ALOP translates to a change in the offset component of capacitor voltage $V_{OFF}$ over time.

The functions of the vernier controller 50 described above encompass a predictive control for the TCSC system 20 which provides the desired system security. This desired security refers to the prompt response of the actual capacitor voltage $V_C$ to the VFOO command signal 85. This security also refers to the ability of the TCSC system to precisely control the duty on the thyristors 36 to minimize damage to the thyristors. This thyristor duty control is provided by the limiter 84 in the illustrated embodiment. Operational security of the TCSC system 20 is also provided because the voltage $V_C$ across the series capacitor 30 does not drift away from a desired setting due to disturbances in the line current $I_L$ flowing through the TCSC system.

To enhance the long term accuracy for the TCSC system 20, the controller 50 has optional correcting means, such as a thyristor ampseconds (ASP) corrector 100, for correcting the predicted firing angle BETAP 80. The ASP corrector 100 provides a feedback path for the actual ampseconds experienced by the thyristors 36a and 36b. This ampsecond value is measured by thyristor monitoring or sensor means, such as a thyristor ampsecond or ASP monitor 102, for monitoring an ampsecond value of the thyristor current $I_T$ pulse flowing through the commutating circuit 32. The ASP monitor 102 may comprise an ammeter for measuring and integrating the thyristor current $I_T$ to determine a value of the ampseconds and provide a corresponding measured thyristor ampsecond (ASPM) signal 104.

The controller 50 has comparing means, such as a comparator 106, for determining a predicted voltage change (DVSP) signal 108 by subtracting the initial VOIM signal 76 from the final VFOL signal 82. The DVSP signal 108 is supplied to the ASP corrector 100. The ASP corrector 100 compares the ASPM signal 104 with the DVSP signal 108 to establish an error signal within the ASP corrector. The ASP corrector integrates this error signal to provide an output of a corrector firing angle (BETAC) signal 110. The controller 50 has summing means, such as a firing angle summer circuit or routine 112, which adds the corrector BETAC signal 110 to the predicted firing angle BETAP signal 80 to obtain a final firing angle command (BETAF) signal 114.

The controller 50 has firing timing means, such as a firing time computer (FTC) 116, for generating the firing command 48 at the upcoming time predicted by the firing predictor 51. The FTC 116 translates the final BETAF signal 114 into the firing pulse signal 48 at the appropriate times in response to the timing signal 54 received from the PLL 52. Upon receiving the firing command 48, the thyristor valve 35 fires to enter a conducting state from a nonconducting state so pulses of thyristor current $I_T$ can flow through the commutating circuit 32.

Figure 4A:
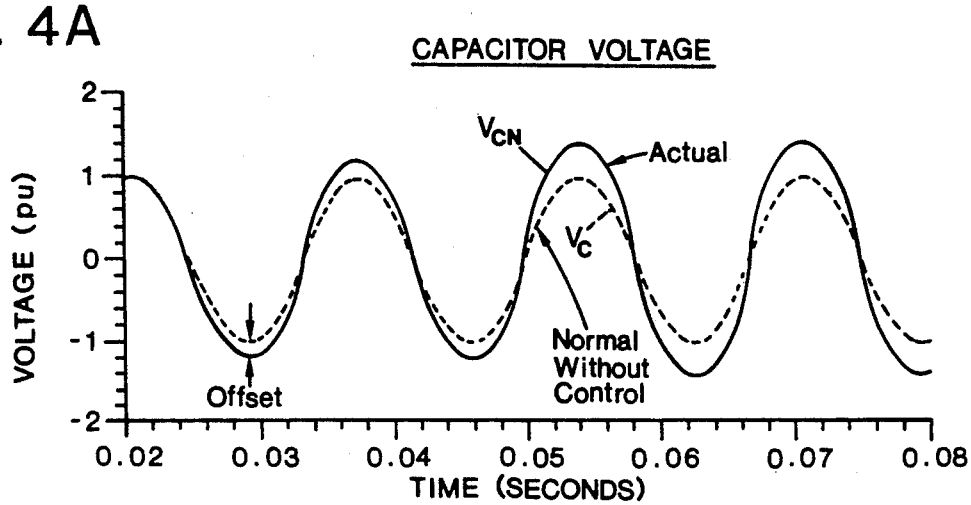
FIGS. 4A, 4B and 4C are graphs of vernier operation of the TCSC system of FIG. 1 acting in response to a step in the commanded capacitor voltage, with FIG. 4A showing the normal and actual capacitor voltage, FIG. 4B showing the thyristor valve current, and FIG. 4C showing the offset order and response.
Figure 4B:
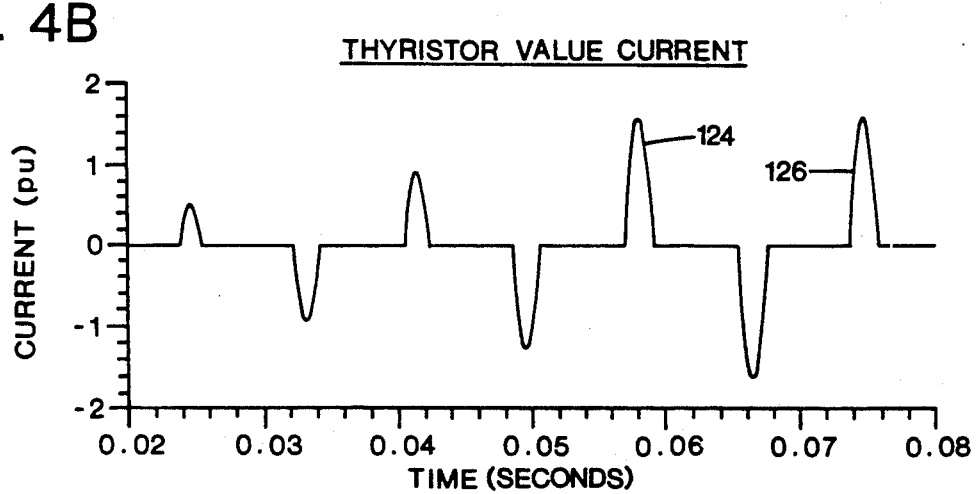
Figure 4C:
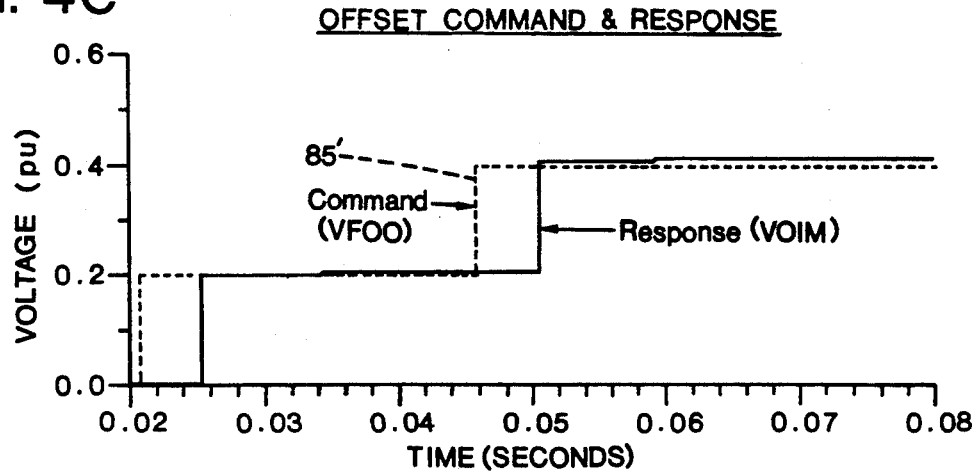
Figure 5A:
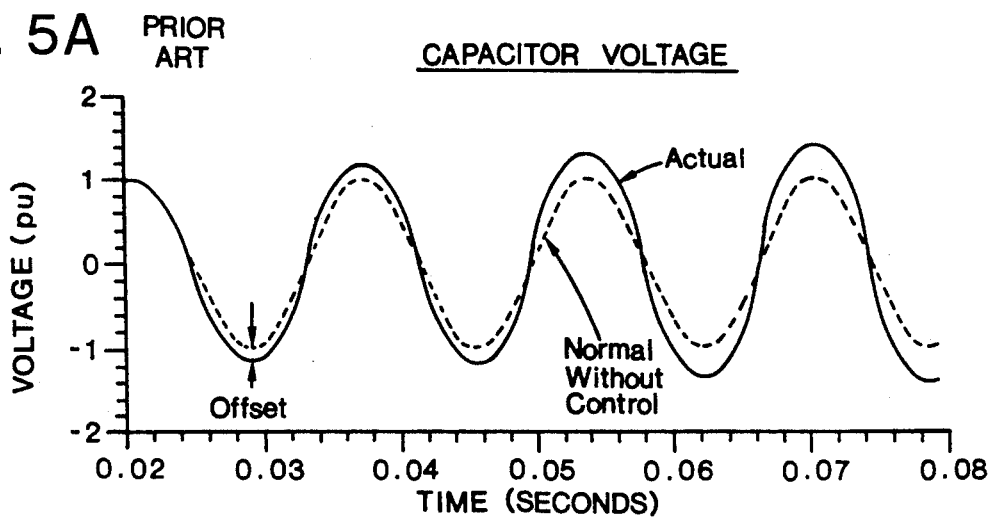
FIGS. 5A, 5B and 5C are graphs of the responses of the prior art Hingorani system acting in response to the same type of step in ordered or commanded capacitor voltage as that of the graphs for FIGS. 4A, 4B and 4C, respectively.
Figure 5B:
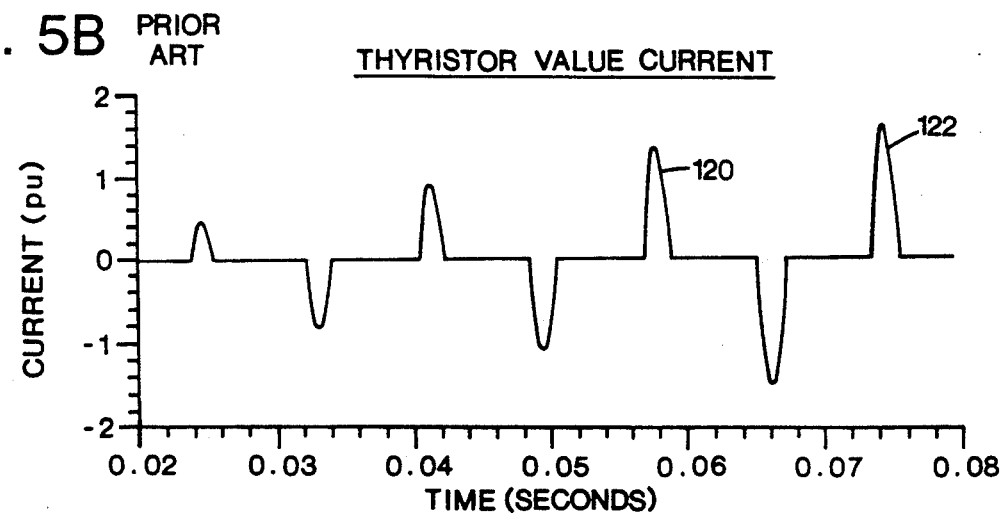
Figure 5C:
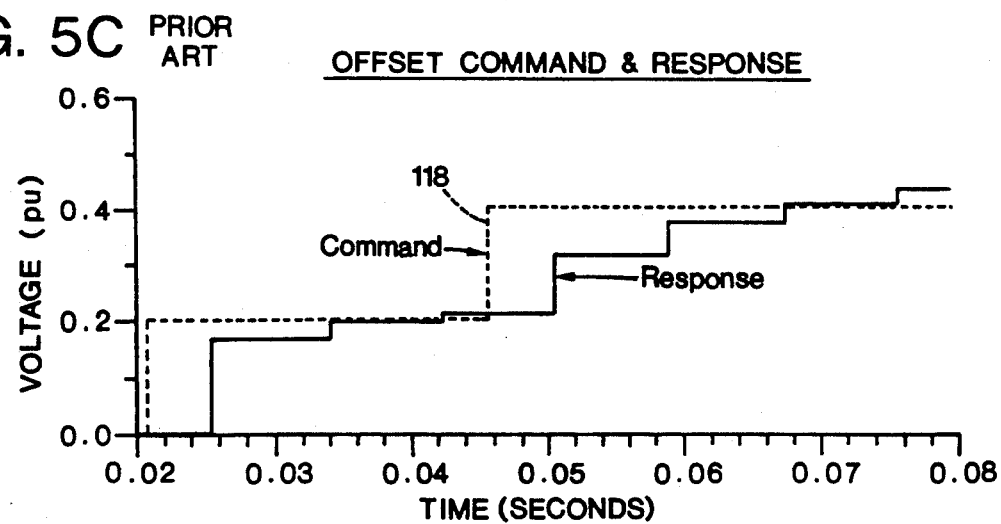

The performance of the TCSC system 20, as shown in FIGS. 4A–4C, is clearly a vast improvement over the operation of the earlier Hingorani system, shown in FIGS. 5A–5C. The wave shapes of FIGS. 4A–4C and 5A–5C show the responses of the system described herein and the Hingorani system, respectively, when subjected to a 0.2 pu (per unit) step change in the ordered capacitor offset voltage.

FIGS. 5A–5C show the Hingorani system slowly creeping upward to the desired level after several valve firings, and then overshooting this desired value. For example, a command 118 to increase the offset voltage is given shortly before 0.046 seconds (see FIG. 5C). As best shown in FIGS. 5B, with a desired thyristor current pulse amplitude of 1.6 pu, a first positive pulse 120 occurring after the command 118 undershoots the desired value, and thereafter, a second positive pulse 122 overshoots this value.

In contrast, the TCSC system 20 provides a prompt response to the VFOO command signal 85', shown in FIG. 4C. For example, the thyristor current pulse amplitude moves promptly to the desired level of 1.6 pu, as shown in FIG. 4B by both positive pulses 124 and 126. Thus, the TCSC system 20 achieves the desired capacitor voltage $V_C$ immediately after the very next valve firing occurring after in the TCSC system 20.

The example of FIGS. 4A–4C illustrates the attainment of the first security objective, namely a fast and accurate response to the VFOO command signal 85 received from the higher-level controller 86. Moreover, these waveforms show that the second security objective of controlling thyristor duty is also satisfied. The thyristor duty is directly related to the change in capacitor voltage on each firing. Thus, precise control of the capacitor voltage also provides precise control of the thyristor duty as well.

The third security objective achieved by the TCSC system 20 relates to the response of the DC offsets in the line current $I_L$. In the absence of any thyristor control, the average capacitor voltage drifts away from the desired zero point if the line current $I_L$ is offset, for example by a system disturbance. This drifting disadvantageously leads to subsynchronous resonance conditions when considering the entire power system circuit comprising an inductive transmission line coupled with a series capacitor. The inductance of the transmission line interacts with the series capacitance to create a series resonant circuit, having a natural frequency which is typically substantially less than the synchronous operating frequency of the AC power system (i.e., 60 Hz for North America). Thus, this natural resonant frequency is referred to as a "subsynchronous frequency."

Figure 6A:
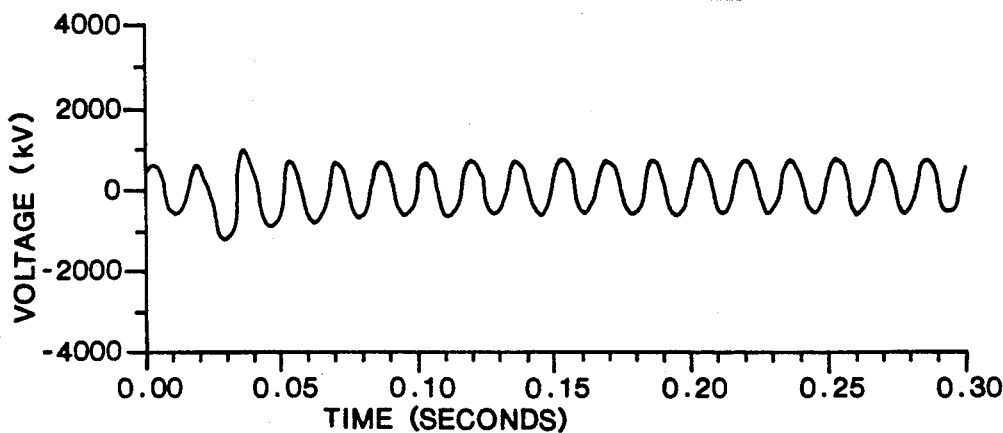
Figure 6B:
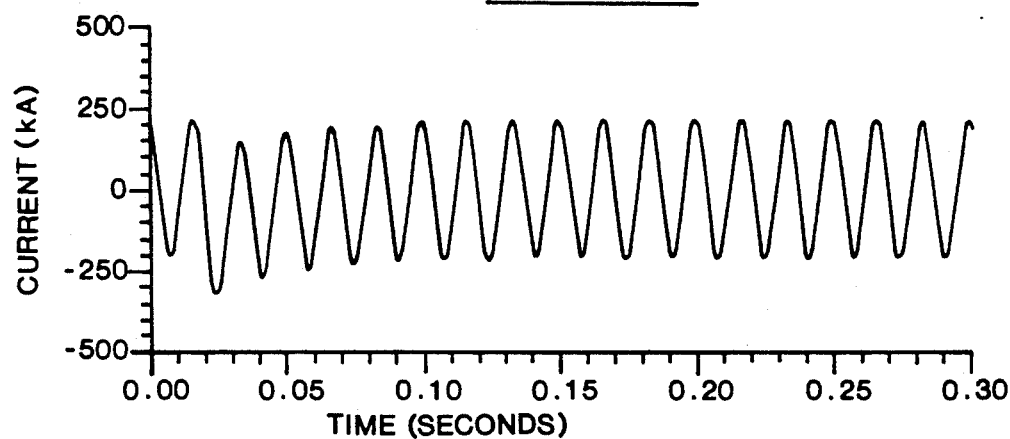
Figure 6C:
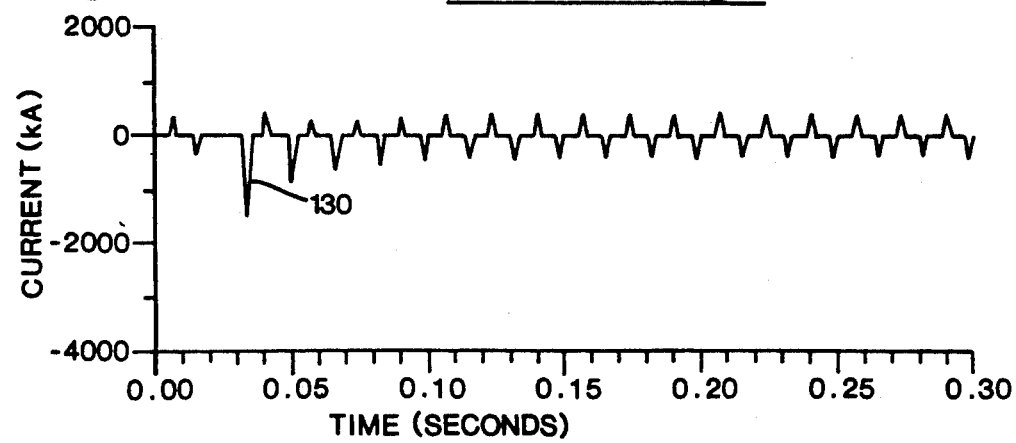

FIGS. 6A–6C illustrate the performance of the TCSC system 20 under subsynchronous resonance conditions when the inductance of the transmission line 24 and the selected capacitance of the series capacitor 30 resonate at 15 Hz. A small disturbance is introduced in the beginning of this simulation around time 0.02 seconds to cause a temporary deviation from steady-state operation. FIG. 6B shows the decay of the DC offset component in the line current $I_L$ back to the 60 Hz zero. The waveforms in FIGS. 6A–6C show recovery back to normal conditions in a smooth and rapid manner using the TCSC system 20.

Figure 7A:
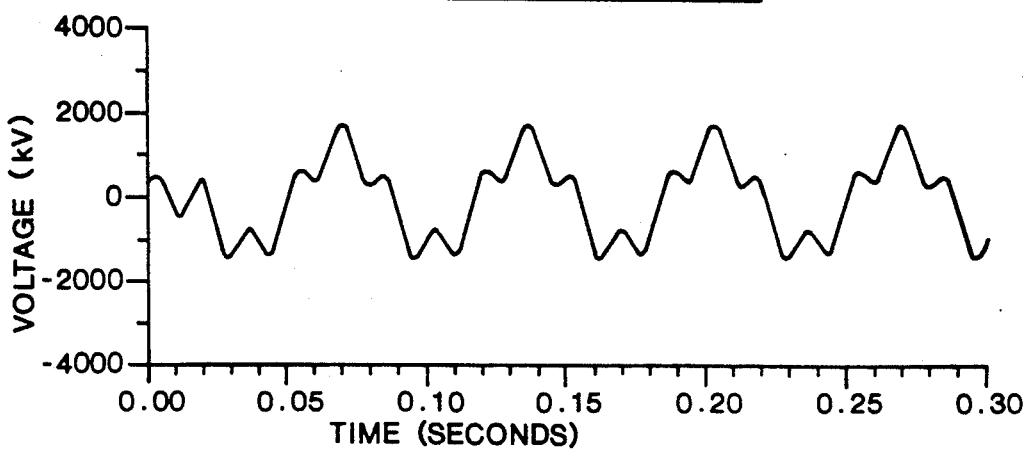
FIGS. 7A and 7B are graphs for a prior art system having no thyristor control, such as a conventional series capacitor application, with FIGS. 7A and 7B showing waveforms of the capacitor voltage, and the line current, respectively.
Figure 7B:
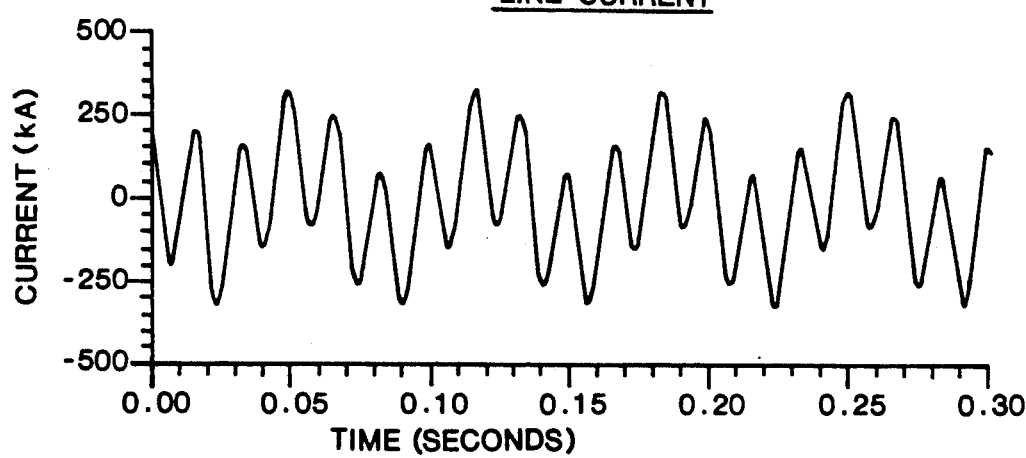

FIGS. 7A and 7B illustrate the response of a conventional series capacitor compensation system having no thyristor control. In contrast with the smooth recovery of the TCSC system 20 in FIGS. 6A–6C, FIGS. 7A and 7B illustrate the nature of response of this circuit if no thyristor control were provided at all. The capacitor voltage waveform of FIG. 7A, and the line current waveform of FIG. 7B, each display a clear 15 Hz component in the waveforms after the initiation of the disturbance. Furthermore, the waveforms of FIGS. 7A and 7B show only a very small damping of the disturbance.

FIGS. 8A–8C show the response of the Hingorani system when used in a network having a transformer line inductance and a series capacitance chosen to resonate at 15 Hz. FIGS. 8A–8C show the response of the Hingorani system when subjected to a small system disturbance on the same order as that applied to the TCSC system 20 for FIGS. 6A–6C. A comparison of FIG. 8A with FIG. 7A, and FIG. 8B with FIG. 7B, shows that the Hingorani system provides an improved response over a circuit lacking any type of thyristor control. However, a comparison of the capacitor voltage traces of FIG. 6A with FIG. 8A, as well as the line current waveforms of FIGS. 6B and 8B, clearly shows that the TCSC system 20 provides significantly faster damping of the transient activity. The firing time prediction method of the TCSC system 20 contributes to this quick response, as well as the choice of a more accurate reference time than that of the earlier systems.

Furthermore, by comparing the thyristor current of FIG. 8C with that of FIG. 6C, it is clear that the TCSC system 20 significantly reduces the duty seen on the thyristors 36. For example, a maximum negative pulse 128 of the Hingorani system (see FIG. 8C) has an amplitude over 3,000 kA. In contrast, a maximum negative thyristor current pulse 130 shown in FIG. 6C has an amplitude of approximately one half that experienced in the Hingorani system. Therefore, by decreasing the peak current through the thyristor valve 35, the duty on the thyristors is significantly reduced, and consequently, the lifetime of thyristors 36 is increased.

Figure 9A:
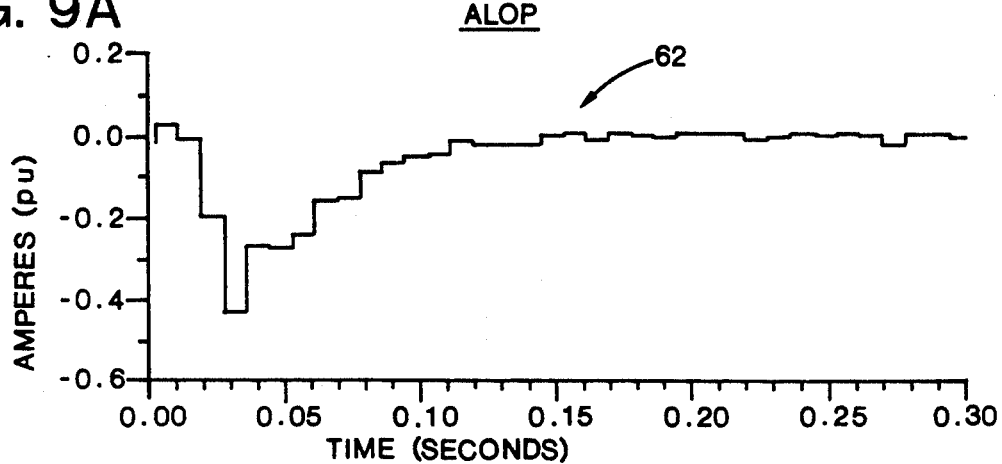
Figure 9B:
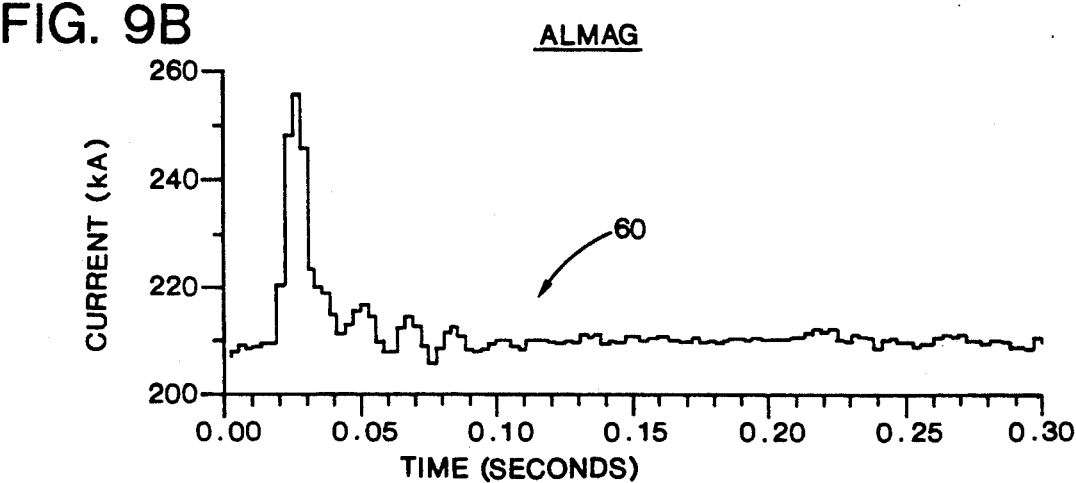
Figure 9C:
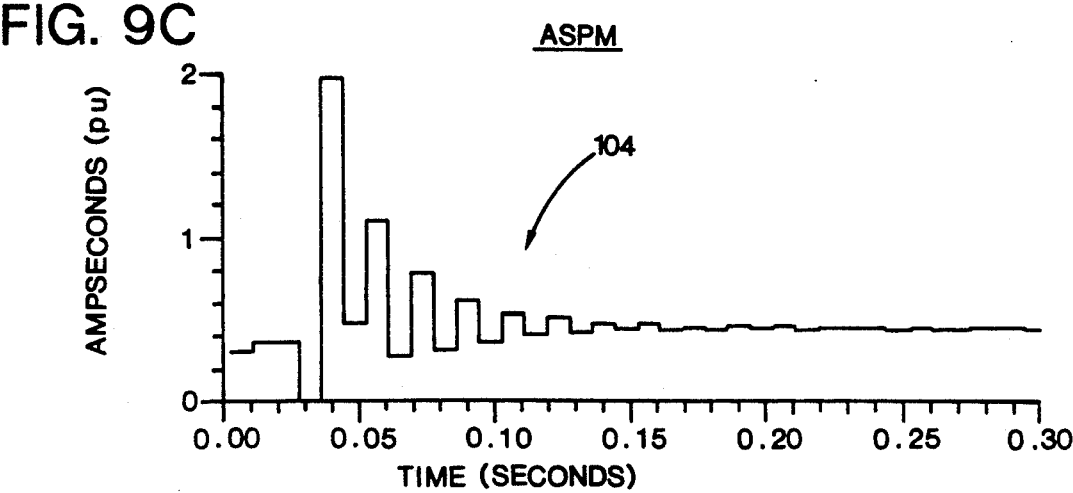
Figure 9D:
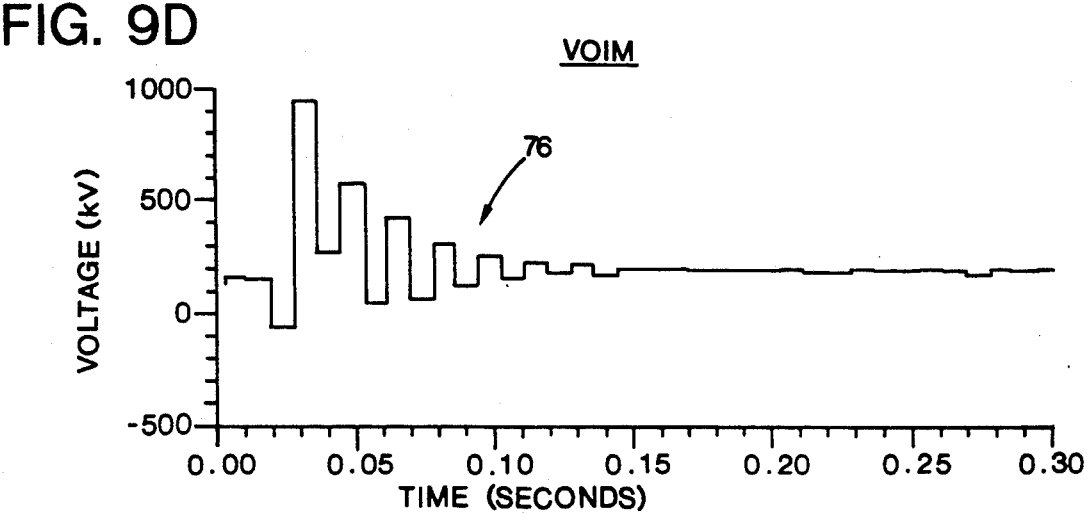
Figure 9E:
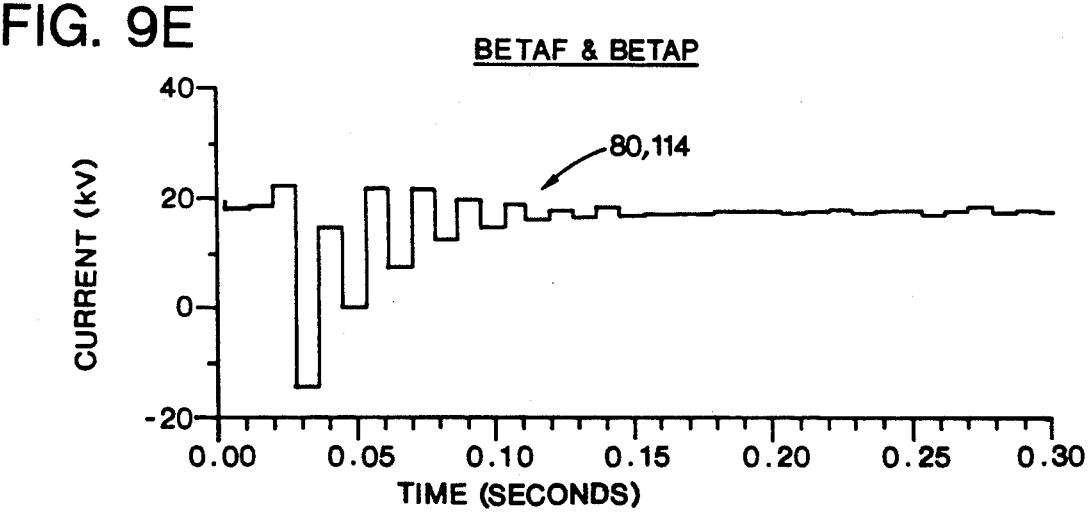

FIGS. 9A–9E show the traces of several of the internal control variables in controller 50 for the 15 Hz subsynchronous resonance frequency example and the small disturbance of FIGS. 6A–6C. FIG. 9A illustrates the measured line current offset component ALOP signal 62 provided by the XDCR 56. FIG. 9B shows the line current magnitude ALMAG signal 60, also produced by the XDCR 56. FIG. 9C shows the measured thyristor ampsecond ASPM signal 104, measured by the ASP monitor 102. FIG. 9D illustrates the output of the $V_C$ predictor 55 portion of the controller 50, that is, the VOIM signal 76 produced by comparator 74, which is indicative of the initial offset before the thyristor current pulse. FIG. 9E illustrates the waveforms of the predicted firing angle BETAP signal 80 and the final firing angle command BETAF signal 114 when the BETAC correction signal 110 is zero.

Having illustrated and described the principles of our invention with respect to a preferred embodiment, it should be apparent to those skilled in the art that our invention may be modified in arrangement and detail without departing from such principles. For example, other combinations of hardware and software may be used to implement the functions of the vernier controller 50 described herein. Furthermore, other types of monitors and signal processors may be used to provide the measured line current $I_{LM}$, the measured capacitor voltage $V_{CM}$, and the measured thyristor ampseconds ASPM to the vernier controller 50. Such structural equivalents for the monitors and the components of the vernier controller 50 are known to be interchangeable by those skilled in the art and may be substituted herein. We claim all such modifications falling with the scope and spirit of the following claims.

We claim:

1. A method of controlling a thyristor controlled series capacitor system having a capacitor in series with a substantially inductive transmission line, and a thyristor switched inductive commutating circuit in parallel with the capacitor, the method comprising the steps of:

monitoring a capacitor voltage across the capacitor;
monitoring a line current flowing through the transmission line;
predicting an upcoming firing time from the monitored capacitor voltage;
switching the commutating circuit to conduct a thyristor current pulse therethrough; and synchronizing the switching step to switch at the predicted upcoming firing time using the monitored line current.

2. A method according to claim 1 further including the step of predicting an upcoming value of a parameter of interest for power flowing through the thyristor controlled series capacitor system.

3. A method according to claim 2 wherein the step of predicting an upcoming value of a parameter of interest comprises the step of predicting the upcoming value at a predetermined intra-cycle time during a thyristor current pulse.

4. A method according to claim 2 wherein the step of predicting an upcoming value of a parameter of interest comprises the step of predicting an upcoming initial capacitor offset voltage value.

5. A method according to claim 2 wherein the step of predicting an upcoming value of a parameter of interest comprises the step of predicting capacitor voltage.

6. A method according to claim 5 wherein the step of predicting the capacitor voltage comprises predicting the capacitor voltage at a predetermined intra-cycle time during a thyristor current pulse using the monitored line current.

7. A method according to claim 1 further including the step of modulating the switching of the commutating circuit to provide a resistive component behavior in the transmission line for the thyristor controlled series capacitor system.

8. A method according to claim 1 further including the steps of:
monitoring a thyristor current pulse flowing through the commutating circuit; and
responsive to the monitoring of the thyristor current pulse, correcting the predicted upcoming firing time.

9. A method according to claim 8 wherein the monitoring step comprises monitoring an ampsecond value of the thyristor current pulse flowing through the commutating circuit.

10. A method according to claim 1 further including the steps of:
predicting an upcoming value of a parameter of interest for power flowing through the thyristor controlled series capacitor system;
modulating the switching of the commutating circuit to provide a resistive component behavior in the transmission line for the thyristor controlled series capacitor system;
monitoring the thyristor current pulse flowing through the commutating circuit; and
responsive to the monitoring of the thyristor current pulse, correcting the predicted upcoming firing time.

11. A method according to claim 1 further including the steps of:
predicting the capacitor voltage at a predetermined intra-cycle time during a thyristor current pulse using the monitored line current;
modulating the switching of the commutating circuit to provide a resistive component behavior for the thyristor controlled series capacitor system with respect to the transmission line;
monitoring an ampsecond value of the thyristor current pulse flowing through the commutating circuit; and
responsive to the monitoring of the thyristor current pulse, correcting the predicted upcoming firing time using the monitored thyristor current pulse ampsecond value.

12. A method according to claim 1 further including the steps of:
determining a predicted normal value of the capacitor voltage without any offset from the monitored line current;
determining a measured line current offset component from the monitored line current;
predicting an intra-cycle offset capacitor voltage by multiplying the measured line current offset component by a gain value;
predicting an initial capacitor offset voltage at a predetermined intra-cycle time during a thyristor current pulse by subtracting the predicted normal value of the capacitor voltage without any offset from the sum of the monitored capacitor voltage and the intra-cycle offset capacitor voltage; and
switching the commutating circuit in response to the predicted initial capacitor offset voltage.

13. A method according to claim 1 further including the steps of:
predicting a normal value of the capacitor voltage without any offset from the monitored line current;
predicting an initial capacitor offset voltage by subtracting the predicted normal value of the capacitor voltage without any offset from the monitored capacitor voltage;
determining a measured line current offset component from the monitored line current;
modulating a capacitor offset voltage command received from a higher-level controller to provide a resistive component behavior for the thyristor controlled series capacitor system with respect to the transmission line;
limiting the initial capacitor offset voltage and the modulated capacitor offset voltage command to provide a limited final capacitor offset voltage and
switching the commutating circuit in response to the predicted initial capacitor offset voltage and the limited final capacitor offset voltage.

14. A method according to claim 1 further including the steps of:
predicting a normal value of the capacitor voltage without any offset from the monitored line current;
predicting an initial capacitor offset voltage by subtracting the predicted normal value of the capacitor voltage without any offset from the monitored capacitor voltage;
limiting the initial capacitor offset voltage and a capacitor offset voltage command received from a higher-level controller to provide a limited final capacitor offset voltage;
predicting a firing angle command signal from the initial capacitor offset voltage and the limited final capacitor offset voltage; and
switching the commutating circuit in response to the predicted firing angle command signal.

15. A method according to claim 14 further including the steps of:
predicting the offset voltage change by subtracting the initial capacitor offset voltage from the limited final capacitor offset voltage;
monitoring an ampsecond value of the thyristor current pulse flowing through the commutating circuit; and correcting the predicted upcoming firing time using the monitored thyristor current pulse ampsecond value and the predicted the offset voltage change.

16. A method according to claim 1 further including the steps of:
predicting a normal value of the capacitor voltage without any offset from the monitored line current;
determining a measured line current offset component from the monitored line current;
predicting an intra-cycle offset capacitor voltage by multiplying the measured line current offset component by a gain value;
predicting an initial capacitor offset voltage at a predetermined intra-cycle time during the thyristor current pulse by subtracting the predicted normal value of the capacitor voltage without any offset from the sum of the monitored capacitor voltage and the intra-cycle offset capacitor voltage;
modulating a capacitor offset voltage command received from a higher-level controller to provide a resistive component behavior for the thyristor controlled series capacitor system with respect to the transmission line;
limiting the initial capacitor offset voltage and the modulated capacitor offset voltage command to provide a limited final capacitor offset voltage;
predicting a firing angle command from the initial capacitor offset voltage and the limited final capacitor offset voltage;
predicting the offset voltage change by subtracting the initial capacitor offset voltage from the limited final capacitor offset voltage;
monitoring an ampsecond value of the thyristor current pulse flowing through the commutating circuit;
correcting the predicted firing angle command using the monitored thyristor current pulse ampsecond value and the predicted offset voltage change to provide a final firing angle command;
determining a predetermined firing timing for the thyristors of the commutating circuit from the monitored line current; and
switching the commutating circuit in response to the predetermined firing timing and the final firing angle command.

17. A method of inducing a predetermined voltage offset into a thyristor controlled series capacitor having a capacitor in series with a substantially inductive transmission line, and a thyristor switched inductive commutating circuit in parallel with the capacitor, the method including the steps of:
monitoring a capacitor voltage across the capacitor;
monitoring a line current flowing through the transmission line;
receiving a capacitor offset voltage command from a higher-level controller;
predicting an upcoming firing time from the monitored capacitor voltage, the measured line current, and the capacitor offset voltage command;
switching the commutating circuit to conduct a thyristor current pulse through the commutating circuit to add the predetermined voltage offset to the capacitor voltage; and
synchronizing the switching step to switch at the predicted upcoming firing time using the monitored line current.

18. A method according to claim 17 further including the step of predicting an upcoming value of a parameter of interest for power flowing through the thyristor controlled series capacitor system.

19. A method according to claim 18 wherein the step of predicting an upcoming value of a parameter of interest comprises the step of predicting the upcoming value at a predetermined intra-cycle time during a thyristor current pulse.

20. A method according to claim 17 further including the step of predicting the capacitor voltage at a predetermined intra-cycle time during the thyristor current pulse using the monitored line current.

21. A method according to claim 17 further including the step of modulating the switching of the commutating circuit to provide a resistive component behavior in the transmission line for the thyristor controlled series capacitor system.

22. A method according to claim 17 further including the steps of:
monitoring a thyristor current pulse flowing through the commutating circuit; and
responsive to the monitoring of the thyristor current pulse, correcting the predicted upcoming firing time.

23. A method according to claim 17 further including the steps of:
monitoring an ampsecond value of the thyristor current pulse flowing through the commutating circuit; and
responsive to the monitoring of the thyristor current pulse, correcting the predicted upcoming firing time using the monitored thyristor current pulse ampsecond value.

24. A vernier controller for controlling a thyristor controlled series capacitor system having a capacitor with a capacitive reactance in series with a substantially inductive transmission line, a thyristor switched inductive commutating circuit in parallel with the capacitor, a voltage sensor monitoring the capacitor voltage across the capacitor, and a current sensor monitoring the line current through the transmission line, the controller comprising:
a capacitor voltage predictor for predicting an initial capacitor offset voltage from the monitored line current received from the current sensor and the monitored capacitor voltage received from the voltage sensor;
a limiter for limiting the initial capacitor offset voltage and a capacitor offset voltage command received from a higher-level controller to provide a limited final capacitor offset voltage;
a storage device for determining a predicted firing angle from the limited final capacitor offset voltage and the predicted initial capacitor offset voltage;
a synchronizer for generating a first timing signal in response to the monitored line current received from the current sensor; and
a firing time computer for switching the commutating circuit to conduct a thyristor current pulse therethrough in response to the first timing signal and the predicted firing angle.

25. A vernier controller according to claim 24 wherein the a capacitor voltage predictor comprises:
normal capacitor voltage determining device for determining a normal capacitor voltage without any offset component from the monitored line current received from the current sensor; and
voltage offset comparator for subtracting the normal capacitor voltage from the monitored capacitor voltage received from the voltage sensor to provide the initial capacitor offset voltage.

26. A vernier controller according to claim 25 wherein the capacitor voltage predictor further includes:
   a phase locked loop device for determining a second timing signal and a sinusoidal function corresponding to the first timing signal from the monitored line current received from the current sensor, with the phase locked loop device also serving as the synchronizer for determining the first timing signal;
   a capacitive reactance factoring device for multiplying the sinusoidal function by the capacitive reactance of the capacitor to provide a factored sinusoidal function; and
   a transduction device for determining a normal line current magnitude from the monitored line current and the second timing signal;
   wherein the normal capacitor voltage determining device determines the normal capacitor voltage without any offset component from the factored sinusoidal function and the normal line current magnitude.

27. A vernier controller according to claim 25 further including:
   a phase locked loop device for determining a second timing signal from the monitored line current received from the current sensor, with the phase locked loop device also serving as the synchronizer for determining the first timing signal;
   a transduction device for determining a line current offset component from the monitored line current and the second timing signal; and
   a voltage prediction enhancer responsive to the line current offset component for enhancing the prediction of the initial capacitor offset voltage by the capacitor voltage predictor to predict the initial capacitor offset voltage during the thyristor current pulse.

28. A vernier controller according to claim 25 further including:
   a phase locked loop device for determining a second timing signal from the monitored line current received from the current sensor, with the phase locked loop device also serving as the synchronizer for determining the first timing signal;
   a transduction device for determining a line current offset component from the monitored line current and the second timing signal; and
   a resistive effect modulator for modulating the capacitor offset voltage command upon receipt from the higher-level controller to provide a resistive component behavior for the thyristor controlled series capacitor system with respect to the transmission line.

29. A vernier controller according to claim 24 further including:
   a thyristor ampsecond monitor for monitoring an ampsecond value of the thyristor current pulse flowing through the commutating circuit; and
   a thyristor ampseconds corrector for correcting the predicted firing angle in response to the monitored thyristor current pulse ampsecond value to provide a final firing angle;
   wherein the firing time computer is responsive to the final firing angle.

30. A vernier controller according to claim 24 wherein the capacitor voltage predictor comprises:
   a phase locked loop device for determining a second timing signal from the monitored line current received from the current sensor, with the phase locked loop device also serving as the synchronizer for determining the first timing signal;
   a transduction device for determining a line current offset component from the monitored line current and the second timing signal;
   a voltage prediction enhancer responsive to the line current offset component for enhancing the prediction of the initial capacitor offset voltage by the capacitor voltage predictor to predict the initial capacitor offset voltage during the thyristor current pulse;
   a resistive effect modulator for modulating the capacitor offset voltage command upon receipt from the higher-level controller to provide a resistive component behavior for the thyristor controlled series capacitor system with respect to the transmission line;
   a thyristor ampsecond monitor for monitoring an ampsecond value of the thyristor current pulse flowing through the commutating circuit; and
   a thyristor ampseconds corrector for correcting the predicted firing angle in response to the monitored thyristor current pulse ampsecond value to provide a final firing angle;
   wherein the firing time computer is responsive to the final firing angle.

31. A thyristor controlled series capacitor system for compensating a substantially inductive transmission line, comprising:
   a capacitor in series with the transmission line;
   a thyristor switched inductive commutating circuit in parallel with the capacitor, the commutating circuit having a thyristor valve responsive to a firing command to conduct a thyristor current pulse therethrough;
   a voltage sensor monitoring a capacitor voltage across the capacitor;
   a current sensor monitoring a line current flowing through the transmission line; and
   a controller responsive to the voltage and current sensors, and to a capacitor offset voltage command received from a higher-level controller, to provide the firing command to the thyristor valve, and responsive to the current sensor to synchronize the timing of the firing command.

32. A thyristor controlled series capacitor system according to claim 31 wherein the controller includes a resistive modeling modulator for modulating the firing of the thyristor valve to provide a resistive component behavior for the thyristor controlled series capacitor system with respect to the transmission line.

33. A thyristor controlled series capacitor system according to claim 31 wherein the controller includes a firing predictor for predicting an upcoming firing time from the monitored capacitor voltage and line current.

34. A thyristor controlled series capacitor system according to claim 33 wherein the controller further includes a voltage prediction enhancer using the monitored line current to enhance the prediction of the firing predictor to predict an upcoming firing time at a predetermined intra-cycle time during a thyristor current pulse.

35. A thyristor controlled series capacitor system according to claim 33 wherein the controller further includes:

a thyristor ampsecond monitor for monitoring an ampsecond value of the thyristor current pulse flowing through the commutating circuit; and an ampsecond corrector for correcting the predicted upcoming firing time using the monitored thyristor current pulse ampsecond value.

* * * * *

UNITED STATES PATENT AND TRADEMARK OFFICE
CERTIFICATE OF CORRECTION

PATENT NO. : 5,202,583
DATED : April 13, 1993
INVENTOR(S) : Einar V. Larsen, et al It is certified that error appears in the above-indentified patent and that said Letters Patent is hereby corrected as shown below:

Column 4, line 9, "FIG." should be --FIG. 1--;

Column 6, line 25, "$V_{Off}$" should be --$V_{OFF}$--;

Column 10, line 53, "with" should be --within--;

Column 13, claim 15, line 3, "the predicted the" should be --the predicted--;

Column 13, claim 16, line 38, "the predicted the" should be --the predicted--; and Column 14, claim 25, line 62, "the a capacitor" should be --the capacitor--.

Signed and Sealed this

Twenty-sixth Day of April, 1994

Attest:

BRUCE LEHMAN

*Attesting Officer*  *Commissioner of Patents and Trademarks*